United States Patent [19]

Loegel, Sr. et al.

[11] Patent Number: 4,991,495
[45] Date of Patent: Feb. 12, 1991

[54] PUMP-ACTUATING MECHANISM

[76] Inventors: Charles Loegel, Sr., Rue des Cochers, F-67 340 Lichtenberg; Isabelle Durr, la rue des Poiriers, F-67 340 Ingwiller; Sylvie Reichert, 115 rue du Gal Goureau, F-67 340 Ingwiller; Patrick Loegel, rue du Zollstock, F-67 340 Lichtenberg; Francine Schneider, 10 rue des Poiriers, F-67 340 Ingwiller; Charles Loegel, Jr., 27 rue du Chateau, F-67 340 Lichtenberg, all of France

[21] Appl. No.: 416,965

[22] Filed: Oct. 4, 1989

[30] Foreign Application Priority Data

Oct. 11, 1988 [DE] Fed. Rep. of Germany ....... 3834610

[51] Int. Cl.⁵ .............................. F16J 15/18
[52] U.S. Cl. ...................... 92/165 R; 92/83; 92/153; 277/124; 277/125; 277/75; 277/103; 277/73
[58] Field of Search .................. 92/83, 86.5, 153, 163, 92/165 R, 167, 168, 247; 277/123, 124, 125, 120, 121, 102, 117, 27, 75, 103, 73

[56] References Cited

U.S. PATENT DOCUMENTS

| 517,509 | 4/1894 | Williams | 277/73 |
| 572,053 | 11/1896 | Garlock | 277/73 |
| 574,353 | 12/1896 | Garlock | 277/73 |
| 1,804,900 | 5/1931 | Vroman | 92/247 |
| 3,382,772 | 5/1968 | Kampert et al. | 92/247 |
| 3,658,348 | 4/1972 | Wink | 92/165 R |
| 3,834,715 | 9/1974 | Butler | 277/75 |
| 4,572,519 | 2/1986 | Cameron et al. | 277/124 |
| 4,832,351 | 5/1989 | Ciotola | 277/73 |

FOREIGN PATENT DOCUMENTS

| 0308390 | 3/1989 | European Pat. Off. | 277/27 |
| 0482316 | 8/1929 | Fed. Rep. of Germany | 277/27 |
| 2039276 | 12/1972 | Fed. Rep. of Germany | 92/165 |
| 2435287 | 2/1975 | Fed. Rep. of Germany | 277/74 |
| 781262 | 5/1935 | France | 277/117 |
| 0102496 | 8/1979 | Japan | 277/125 |
| 0006471 | 1/1984 | Japan | 277/102 |
| 0144472 | 7/1986 | Japan | 277/27 |
| 0242687 | 10/1946 | Switzerland | 277/125 |
| 0585308 | 12/1977 | U.S.S.R. | 92/86.5 |
| 0623035 | 8/1978 | U.S.S.R. | 277/123 |
| 0838212 | 6/1981 | U.S.S.R. | 277/27 |

Primary Examiner—Edward K. Look
Assistant Examiner—Thomas Denion
Attorney, Agent, or Firm—Hopgood, Calimafde, Kalil, Blaustein & Judlowe

[57] ABSTRACT

In order to increase the delivery pressure of the reciprocating pump-actuating mechanism of hydraulic feed pumps having a high pumping capacity, stacks of thin spacer discs are provided on either side of a sealing ring sealingly engaged in a sealing position between the plunger and the cylindrical bushing, said stacks of spacer discs being axially movable along the plunger in the normal non-sealing position. A pressure-distributing bushing is disposed between the stack of spacer discs which faces the free end face of the plunger and the sealing ring, said pressure-distributing bushing rapidly compensating the pressure between said stack of spacer discs and the end face of the pressure-distributing bushing facing the sealing ring.

13 Claims, 1 Drawing Sheet

PUMP-ACTUATING MECHANISM

BACKGROUND OF THE INVENTION

The invention relates to construction of a pump-actuating mechanism for a high-capacity reciprocating hydraulic pump, particularly having a discharge capacity of 10 liters/minute or more and at a pressure exceeding 1000 bar. The plunger is exposed to liquid in the pump chamber, between check valves at the inlet and outlet of the chamber.

Pump-plunger constructions of this type are known, wherein the plunger is a cylindrical rod, driven at one end and guided at its other end by the bore of a plunger housing. The plunger housing is open to the pump chamber at the guided end; and axially behind the region of plunger guidance, the bore expands to an elongate cylindrical counterbore, within which a sealing ring of relatively large axial length is axially compressed between two solid back-up rings which add substantially to the relatively large axial length. A helical spring is also contained within the counterbore, being interposed between the forward back-up ring and the sealing ring, to compressionally bias or preload the sealing ring against the rear back-up ring, whereby the sealing ring is axially squeezed to enlarge its outer diameter into sealed relation with the counterbore and to reduce its inner diameter into sealed engagement with the outer cylindrical surface of the plunger. When the plunger leaves its retracted and sealed position in a driven forward stroke, the biasing action of the spring is momentarily reduced and the rear back-up ring transiently undergoes an axial displacement along the plunger.

It has been found, however, that especially at high pumping capacities in the order of a multiple of 10 liters/min. the known pump-actuating mechanism ceases to operate satisfactorily, as soon as discharge pressures are required to be greater than 1000 bar, and in particular greater than 1400 bar.

BRIEF STATEMENT OF THE INVENTION

The object of the invention is to provide improved pump-actuating mechanism of the character indicated, using simple means and enabling long-term operability, at significantly greater discharge pressures, e.g., up to 2000 bar or more.

The invention achieves the above object by avoiding use of a preloading spring, and by employing at least one axially short sealing ring which sealingly engages the counterbore and the plunger when compressed, and which clears one or both of these surfaces when its compression is relaxed. Stacked spacer discs are mounted on either side of the sealing ring and are displaced in small incremental amounts in the course of each cycle of plunger reciprocation. Pressure fluctuation for liquid which floods the spacer discs provides correctly synchronized compression of the seal when needed in the forward (pumping) stroke of the plunger.

It has been found that the use of stacks of thin spacer discs axially on either side of the sealing ring provides prolonged full operability even though no biasing springs are used for the back-up ring, and that discharge pressures can be substantially higher than 1400 bar. In the invention, due to developing pressure differences, primarily in the stack of spacer discs facing the plunger end, the stack automatically changes its axial length due to the fact that spacer discs of the stack disengage from each other to form small gaps when the plunger leaves its sealing position, and the discs re-engage on the return stroke of the plunger. And by using stacks of thin spacer discs, other insert members fitted onto the plunger are only relatively slightly moved axially in the course of each plunger cycle of reciprocation. As a result, heating of the plunger is substantially reduced as compared with the known pumping constructions, and there is no need to provide additional cooling passages inside the plunger or its housing.

It is advantageous when the sealing ring and the spacer discs (as well as any other possible ring inserts such as a pressure-distributing bushing and a thrust ring, as well as the back-up rings) cumulatively exhibit a relatively small axial expansion as well as relatively small mass. In this circumstance, less mechanical energy is required for the reciprocating movement of the plunger and of such inserts as move along the same, so that less kinetic energy is involved. The axial thickness of individual rings in the stack should not exceed the difference between their outer and inner diameters, and the axial thickness is preferably much less than said difference.

Suitably, each stack comprises several hundred parallel spacer discs, wherein disc thickness preferably is selected between 0.1 mm and 1 mm, especially between 0.1 mm and 0.5 mm. The spacer discs should be either of stainless steel or of a suitable plastics material.

In accordance with a particularly preferred embodiment of the invention, a pressure-distributing bushing is inserted between the stack of spacer discs which is on the driving-end side of the sealing ring; said bushing has pressure-compensating passages to direct pressure transients from radially outside of the pressure-distributing bushing toward an axial-end face thereof, where a thrust ring abuts and projects a preferably annular projection into a mating annular recess of the sealing ring. When increased pressure develops at the plunger end face, this pressure is propagated via the pressure-compensating passages toward those parts of the thrust ring which are located at a radial offset from the periphery thereof. The axial projection of the thrust ring is urged into the axial recess formed in the sealing ring to thereby additionally develop a radially expanding action on the sealing ring, both radially outwardly and radially inwardly, whereby the sealing function is additionally improved. To this end, the cross-section of the projection should be at least somewhat larger than that of the recess, thus assuring radial expansion of sealing ring.

DETAILED DESCRIPTION

The invention will be described in detail for a preferred embodiment, in conjunction with the accompanying drawings, in which.

Figure 1:
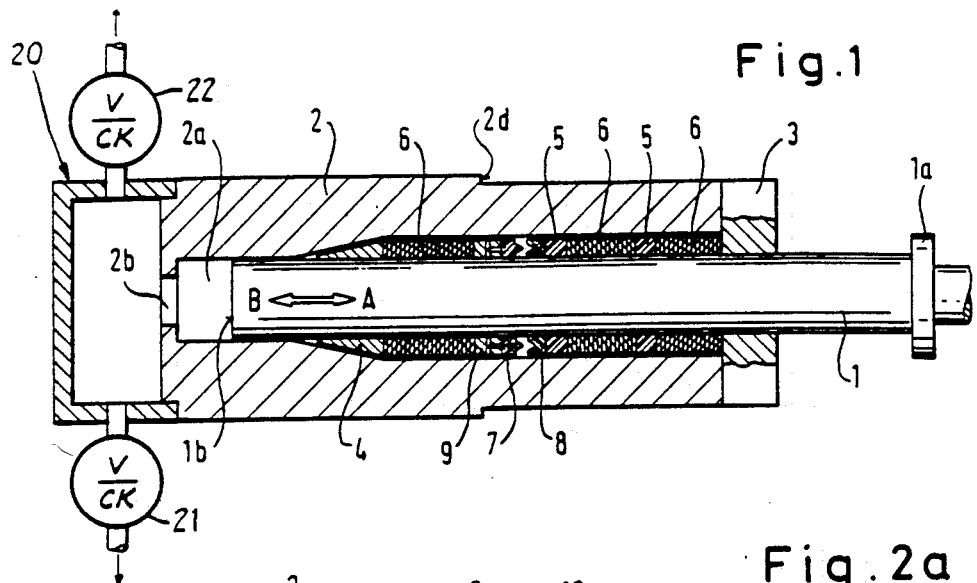
FIG. 1 is a schematic partial sectional view through a hydraulic pump having a pump-actuating mechanism of the invention.

As shown in FIG. 1, the pump-actuating mechanism comprises a cylindrical plunger 1 having a free end face 1b at one end and a collar 1a at its other end, for engagement with reciprocating drive means (not shown); however, the axial reciprocation of plunger 1 is suggested by directional arrows A and B. Plunger 1 is reciprocally driven within a cylindrical housing 2 having a forward cylindrical bore which provides piloting guidance for the free forward end of the plunger. To the rear of its plunger-piloting forward end, the bore of the housing expands to a larger-diameter cylindrical counterbore (2d, FIGS. 2a, 2b) to accommodate an axial succession of plural annular inserts 4, 5, 6, 7, 8, 9. At the limit of its retracted stroke, the end face 1b of the plunger just axially clears the axially inner end of cylindrical bore 2a, whereby an incrementally greater clearance develops between end face 1b and the beginning of the expanding conical portion of the counterbore of cylindrical housing 2. When plunger 1 undergoes its retraction stroke, in the direction A, hydraulic fluid such as water flows through a forward passage 2b into the cylindrical bore 2a.

The outer periphery of the cylindrical housing 2 is provided with a shoulder abutment 2d, to receive a conventional retaining ring and associated helical spring (not shown). When the inserts (4 to 9) have been fitted, the cylindrical housing 2 is closed at its rear end, remote from passage 2b, by means of a sealing flange 3 which is secured by bolt means (not shown) to the rear end of the cylindrical housing 2.

The passage 2b is open to the chamber 20 of the pump, shown served via an inlet check valve 21 and an outlet check valve 22. During the retraction stroke of plunger 1 (direction A), the outlet check valve 22 is closed and therefore an increment of fluid is drawn into chamber 20 (and also into bore 2a) via the inlet check valve 21; and in the driving stroke of plunger 1 (direction B) inlet check valve 21 is closed while pumped fluid is expelled from bore 2a and from chamber 20, via the outlet check valve 22.

During a driving stroke of the plunger (direction B), an annular abutment cone 4 is free to engage the conical wall of the expanding region of the housing bore. The annular cone 4 terminates in a flat radial wall, and the axial succession of annular inserts rearward of cone 4 is as follows:

Adjacent the abutment cone 4 is a first stack of thin spacer discs 6 of stainless steel having different thicknesses, for example of 0.1 mm, 0.2 mm and 0.5 mm, in interlaced succession. This first stack is formed by about 500 such spacer discs which are oriented parallel to each other and in planes normal to the plunger axis.

Then follows a pressure-distributing bushing 9, of bronze, plastics material or stainless steel, and formed with radial passages 9a and axial passages 9b which provide for pressure-compensating flow from the periphery to the rear-end face of the bushing, at radial locations intermediate the radially inner and outer limits of the bushing.

This end face of the pressure-distributing bushing 9, where the axial passages 9b are open, is contiguous with the adjacent end face of a thrust ring 7; and the opposite end face of the thrust ring 7 is characterized by an annular axial projection 7a of approximately triangular cross-section.

Figure 2A:
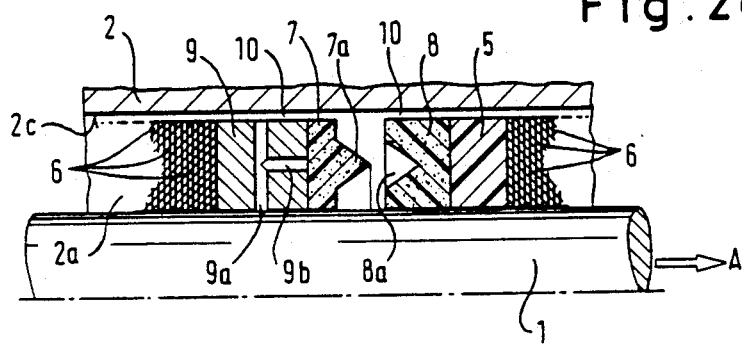
FIG. 2a is an enlarged fragmentary detail of the section of FIG. 1, in its normal (relaxed) position, in which the thrust ring is axially spaced from the sealing ring.
Figure 2B:
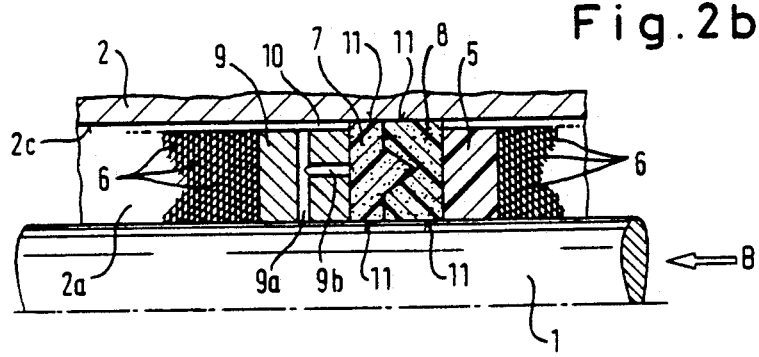
FIG. 2b is a view similar to FIG. 2a, to show the parts in sealing position.

As illustrated in FIGS. 2a and 2b, the end of the thrust ring 7 which is formed with the projection 7a is contoured to mate with the confronting annular recess 8a of a sealing ring 8. In FIG. 2b, projection 7 is seen to engage in recess 8a; and pressure developing via the pressure-compensating passages i.e., via radial passages 9a and axial passages 9b, causes the sealing ring 8 to be axially compressed by the thrust ring 7 while the sealing ring 8 is also caused by means of the projection 7a to expand both radially inwardly and radially outwardly, into sealing engagement with the cylindrical bore 2c and with the cylindrical surface of plunger 1.

On the other hand, in the normal or relaxed position shown in FIG. 2a, an axial clearance may exist between thrust ring 7 and the sealing ring 8, thereby establishing an annular clearance 10 between these two inserts and the counterbore wall 2c of the cylindrical housing 2. These gaps 10 will disappear in the sealing position shown in FIG. 2b, because the thrust ring 7 is not only tightly pressed axially against the sealing ring, but at the same time the sealing ring is elastically deformed into sealing relation with respect to the housing 2, on the one hand, and to the plunger 1, on the other hand, at axial locations 11; additionally, the thrust ring 7 itself is elastically deformed into sealing relation at the respective sealing locations 11, since in accordance with the present embodiment of the invention, the thrust ring 7 is formed of the same resilient material as the sealing ring 8, and can therefore expand in both radial directions.

Adjacent the sealing ring 8, a back-up ring 5 is provided, and ring 5 is followed by a second stack of spacer discs 6'.

In successive axially contiguous relationships, FIG. 1 shows a further back-up ring 5 and then a third stack of spacer discs 6'; the last disc of said stack bearing against the confronting end face of the sealing flange 3.

In the normal position schematically illustrated in FIG. 2a, a new increment of hydraulic material such as water has been drawn, to flow through passage 2b into the cylindrical bore 2a; pressure will also have been built in the free spaces between the plunger 1 and the bore of cylindrical housing 2. Water flows into space also substantially occupied by the first stack of spacer discs 6 and "fans" (i.e., distributes) the same by forming small axial gaps between the spacer discs 6 and by axially moving the pressure-compensating bushing 9 in the direction A, whereby the thrust ring 7 is also moved in the same direction until it abuts the sealing ring 8. Further pressure build-up causes expansion of the sealing ring 8 and possibly also of the thrust ring 7 in radial directions to form the seals shown at locations 11 in FIG. 2b.

On the other hand, when the hydraulic material to be pumped has been expelled by the plunger stroke in the opposite direction B, i.e., from the cylindrical bore 2a through passage 2b, a kind of vacuum will be produced in the space defined by the first stack of spacer discs 6, so that they leave and therefore relieve the sealing relation of FIG. 2b; at the same time, the thrust ring 7 with the pressure-compensating bushing 9 similarly moves in the direction B, with the result that the sealing ring 8 and the thrust ring 7 again adopt their normal positions, in which the annular gaps 10 are formed.

The other stacks of spacer discs 6' on the opposite side of sealing ring 8 also have a certain "spring action" although these spacer discs 6' need not be made from spring steel or from material of like elasticity.

The pump-actuating mechanism of the invention has already proved to be extremely satisfactory. It can be manufactured with few inexpensive component parts; it has great mechanical stability and is resistant to large changes in dynamic cycle, even at high frequency and spite of many hours of continuous operation. Moreover, the plunger does not heat to undesirably high temperatures.

It is suitable for the other stacks 6' of spacer discs to respectively comprise a multiplicity of spacer dics, in the order of at least some dozens or, even better, a few hundreds of relatively thin discs.

Polyamide is a suitable material for the sealing ring 8, and possibly also for the thrust ring 7, especially the polyamide known as PA6.6, containing $MoS_2$ and sold under the tradename NYLATRON. Further specific additives such as bronze, graphite, and glass fibres, enable achievement of high thermal stability. This applies especially in the case of polytetrafluoroethylene and copolymers of tetrafluoroethylene and hexafluoropropylene sold under the tradename TEFLON. Aramides are also suitable materials. Particular advantages result from the use of the polyether ether ketone known under the tradename PEEK. Polyamide-based moulding compounds filled with glass fibres and/or with graphite; for example, the product sold under the tradename KINEL, may well be used for the sealing ring 8 and possibly also for the thrust ring 7.

Instead of water, the pump-actuating mechanism of the invention, is well suited to feed other liquids, especially oils. However, it is important that the hydraulic material to be pumped be practically incompressible. Each hydraulic pressure transient originating at the end face 1b and propagating in the direction A, in conjunction with the first stack of spacer discs 6 and the pressure-distributing bushing 9, acts like a ram on the thrust ring 7 and on the sealing ring 8, whereby the sealing ring 8 provides a complete seal. When the hydraulic pressure transient decreases, after completion of the driving stroke (direction B), the stack expands axially and the sealed state is released.

What is claimed is:

1. Pump-actuating mechanism for a high-capacity feed pump having a delivery pressure of more than 1000 bar, said mechanism comprising a housing having a cylindrical bore, a plunger axially reciprocatable in said bore, a sealing ring mounted to said plunger within said bore, said sealing ring (i) in a normal position thereof having a non-sealing relation with both the plunger and the bore and (ii) in a sealing position thereof having sealing engagement with both the plunger and the bore, and separate stacks of thin spacer discs mounted to said plunger on opposite axial sides of said sealing ring, said discs having running clearance with both the plunger and the bore so that individual discs can move axially with respect to each other and to said sealing ring when said sealing ring is in said normal position.

2. Pump-actuating mechanism as claimed in claim 1, in which a first back-up ring is interposed between said sealing ring and one of said stacks of spacer discs, and in which a second back-up ring is interposed between said sealing ring and the other of said stacks of spacer discs, said back-up rings having running clearance with both the plunger and the bore.

3. Pump-actuating mechanism as claimed in claim 1, in which a pressure-distributing bushing (9) is mounted on the plunger (1) at the end face of the sealing ring (8) which faces the plunger end (1b) and so as to be axially movable at least in the normal position thereof, said pressure-distributing bushing having pressure-compensating passages between the stack of spacer discs (6) facing the plunger end (1b) and the end face of the sealing ring (8) facing said stack.

4. Pump-actuating mechanism as claimed in claim 1 in which the sealing ring (8) is formed with an annular recess (8a) in one end face and in which a thrust ring (7) is mounted on the plunger (1) between said end face and the adjacent stack of spacer discs (6), said thrust ring having an annular projection (7a) which engages said annular recess (8a) when in sealing position.

5. Pump-actuating mechanism as claims in claim 3, in which the thrust ring (7) is disposed intermediate the sealing ring (8) and the pressure-distributing bushing 9.

6. Pump-actuating mechanism as claimed in claim 1, in which two stacks of spacer discs (6') separated by a back-up ring (5) are disposed on the plunger (1) on the side of the sealing ring (8) remote from the plunger end (1b).

7. Pump-actuating mechanism as claimed in claim 4, in which the thrust ring (7) in the sealing position is also a sealing ring.

8. Pump-actuating mechanism as claimed in claim 4 or claim 6, in which the sealing ring (8) and/or the thrust ring (7) is made of a resilient plastics material.

9. Pump-actuating mechanism as claimed in claim 1, in which the spacer discs (6) are made from stainless steel.

10. Pump-actuating mechanism as claimed in claim 1 in which the spacer discs (6) are made from plastics material.

11. Pump-actuating mechanism as claimed in claim 1, in which the spacer discs (6) are annuli having thickness in the range of between 0.1 mm and 1 mm.

12. Pump-actuating mechanism as claimed in claim 3, in which the sealing ring (8) is formed with an annular recess (8a) is one end face, and in which a thrust ring (7) is mounted on the plunger (1) between said end face and the adjacent stack of spacer discs (6), said thrust ring having an annular projection (7a) which engages said annular recess (8a) when in sealing position, and in which pressure-compensating passages of the pressure-distributing bushing (9) include axial bores (9b) which open towards the end of the thrust ring (7) remote from the projection (7a).

13. Pump-actuating mechanism as claimed in claim 3, in which the sealing ring (8) is formed with an annular recess (8a) in one end face, and in which a thrust ring (7) is mounted on the plunger (1) between said end face and the adjacent stack of spacer discs (6), said thrust ring having an annular projection (7a) which engages said annular recess (8a) when in sealing position, and in which pressure compensating passages of the pressure distributing bushing (9) include axial bores (9b) which open towards the end of the thrust ring (7) remote from the projection (7a), said pressure-distribution passages being open to the periphery of the pressure-compensating bushing (9) and having radial bores (9a) which communicate with the axial bores (9b).

* * * * *